United States Patent [19]
Smith

[11] Patent Number: 5,301,544
[45] Date of Patent: Apr. 12, 1994

[54] METHOD AND APPARATUS FOR DETERMINING THE CENTER OF GRAVITY OF AN OBJECT

[75] Inventor: Steven L. Smith, Oxford, Conn.

[73] Assignee: United Parcel Service of America, Inc., Atlanta, Ga.

[21] Appl. No.: 895,097

[22] Filed: Jun. 8, 1992

[51] Int. Cl.⁵ .................................. G01M 1/00
[52] U.S. Cl. ........................ 73/65.07; 73/65.01
[58] Field of Search ............... 73/65.02, 65.03, 65.05, 73/65.06, 65.07, 65.09, 483

[56] References Cited

U.S. PATENT DOCUMENTS

| | | |
|---|---|---|
| 2,751,921 | 6/1956 | Baldwin et al. ............... 73/65 |
| 2,782,631 | 2/1957 | Baltrukonis et al. |
| 3,198,513 | 8/1965 | Farez. |
| 3,221,543 | 12/1965 | Hall et al. ................. 73/65.06 |
| 3,242,342 | 3/1966 | Gabar. |
| 3,435,667 | 4/1969 | Browning et al. |
| 3,515,254 | 6/1970 | Gary. |
| 4,639,872 | 1/1987 | McHale et al. ................. 73/65 |

Primary Examiner—Richard E. Chilcot, Jr.
Assistant Examiner—R. Biegel
Attorney, Agent, or Firm—Steve Mendelsohn; Robert Rosenthal; William H. Murray

[57] ABSTRACT

The present invention is an apparatus for and method of determining the three-axis center of gravity of objects. The apparatus of the present invention has a conveyor assembly that receives a package from an upstream conveyor path. After being received, the package is decelerated in a controlled manner to a complete stop. Package motion is then resumed to propel the package off the apparatus onto the downstream conveyor path. During both the deceleration and stop periods, signals are generated by load cells supporting the conveyor assembly. These generated signals are representative of the load applied by the package at the load cells. The three components of the center of gravity of the package are calculated from these generated signals.

23 Claims, 5 Drawing Sheets

METHOD AND APPARATUS FOR DETERMINING THE CENTER OF GRAVITY OF AN OBJECT

BACKGROUND OF THE INVENTION

1. Field of the Invention

The present invention relates to determining the center of gravity of objects, and, in particular, to methods and apparatuses for determining the three-axis center of gravity of packages on conveyor systems.

2. Statement of Related Art

In the field of package shipping, packages are gripped by automated handling systems to move packages from one location to another. In addition, in the field of package shipping, packages are stacked one upon the other into self-supporting walls of packages. In both the gripping and stacking of packages, knowledge of the location of the center of gravity of each package is important. In gripping by automated handling systems, the location of the center of gravity of a package determines the most stable grip position. In stacking of packages into self-supporting walls, the location of the center of gravity of a package determines the most stable placement position for that package in a stack with other packages.

In the field of package shipping, packages need to be moved and placed quickly, safely, and cheaply. As such, speed, accuracy, and cost are important criteria in determining the effectiveness of a system for measuring the center of gravity of a package in the field of package shipping. Better systems of measurement are those that can measure the center of gravity of packages with high accuracy in a short amount of time and at a low cost.

The location of the center of gravity of a package may be represented by three coordinates in the standard three-axis orthogonal cartesian coordinate system. This representation is known as the three-axis center of gravity. In this three-axis center of gravity representation, each coordinate represents the displacement of the center of gravity of the package along the corresponding axis of the cartesian coordinate system from some reference point, such as a selected corner of the package.

In known systems for the measurement of the location of the center of gravity of packages, each coordinate of the three-axis center of gravity is determined individually and separately. U.S. Pat. No. 2,782,631, issued to Baltrukonis et al. on Apr. 14, 1955, teaches a center of weight distribution locator for measuring the center of gravity of an object. This locator measures the location of the center of gravity of an object in one axis at a time.

In order to use the locator of Baltrukonis et al. to determine all three coordinates of the three-axis center of gravity of packages propelled along a conveyor system, it is necessary to remove each package from the conveyor system and measure each coordinate individually with the locator. This process requires removing the package from the package stream, placing the package on the locator to measure one coordinate of the center of gravity, rotating the package in the proper direction to measure a second coordinate, rotating the package a second time about a different axis to measure the third coordinate, and replacing the object onto the package stream. Such a process for determining the three-axis center of gravity using the locator of Baltrukonis et al. is time consuming and involves inefficient movement. In addition, the mechanism required to remove, rotate, and replace each package in order to measure automatically all three coordinates would be very expensive.

Thus, while the prior art does teach systems for measuring the three-axis center of gravity of packages, the slow speed and high cost of such systems make it ill suited for the field of package shipping. What is needed is a system for measuring the three-axis center of gravity of packages in a stream of packages without having to remove the packages from the stream and with minimal disruption of the flow of the package stream.

SUMMARY OF THE INVENTION

The present invention is for apparatuses and methods for determining the X-, Y-, and Z-axis components of the three-axis center of gravity of an object. An apparatus of the present invention determines a first component of the center of gravity of an object along a first axis and a second component of the center of gravity of the object along a second axis, wherein the first and second axes are two axes of a three-dimensional coordinate system. This apparatus includes a support structure for supporting the load of the object at a plurality of known non-collinear locations; load sensors for generating a load signal representative of the load applied by the supported object at each of the non-collinear locations; and a controller for receiving the load signals and for calculating the first and second components of the center of gravity of the object based upon the load signals.

A method of the present invention is for determining a first component of the center of gravity of an object along a first axis and a second component of the center of gravity of the object along a second axis, wherein the first and second axes are two axes of a three-dimensional coordinate system. This method involves the steps of (a) supporting the load of the object at a plurality of known non-collinear locations; (b) generating a load signal representative of the load applied by the supported object at each of the non-collinear locations; and (c) calculating the first and second components of the center of gravity of the object based upon the load signals.

Another apparatus of the present invention determines a component of the center of gravity of an object along a first direction not perpendicular to the direction of gravity. This apparatus includes support structure for supporting the load of the object at a plurality of known non-collinear locations and a propagation mechanism for selectively accelerating and non-accelerating the supported object in a second direction not parallel to the first direction and not parallel to the direction of gravity. Load sensors in the apparatus generate an accelerated load signal representative of the load applied at at least one of the non-collinear locations by the supported object during acceleration of the supported object. The load sensors also generate a non-accelerated load signal representative of the load applied at at least one of the non-collinear locations by the supported object during non-acceleration of the supported object. In addition, the apparatus includes a controller for receiving said accelerated and non-accelerated load signals, and for determining the component of the center of gravity of the object based upon said received signals.

Another method of the present invention is for determining a component of the center of gravity of an object along a first direction not perpendicular to the direction of gravity. Under this method, the load of the object is supported at a plurality of known non-collinear locations. The supported object is accelerated in a second direction not parallel to the first direction and not parallel to the direction of gravity. During that acceleration, an accelerated load signal is generated. The accelerated load signal is representative of the load applied at at least one of the non-collinear locations by the supported object during acceleration of the supported object. The supported object is then moved at a constant non-accelerated rate in the second direction. During that non-acceleration, a load signal is generated that is representative of the load applied at at least one of the non-collinear locations by the supported object during non-acceleration of the supported object. Lastly, the component of the center of gravity of the object is calculated based upon the accelerated and non-accelerated load signals.

Yet another apparatus of the present invention determines first, second, and third components of the center of gravity of an object. The first, second, and third components correspond to the components of the center of gravity along first, second, and third axes of a three-dimensional coordinate system, respectively. The first and second axes are not parallel to the direction of gravity and the third axis is not perpendicular to the direction of gravity. This apparatus includes support structure for supporting the load of the object at a plurality of known non-collinear locations and a propagation mechanism for selectively accelerating and non-accelerating the supported object along the first axis. Load sensors in the apparatus generate an accelerated load signal representative of the load applied at at least one of the non-collinear locations by the supported object during acceleration of the supported object. The load sensors also generate a non-accelerated load signal representative of the load applied at each of the non-collinear locations by the supported object during non-acceleration of the supported object. The apparatus also includes a controller for calculating the first, second, and third components of the center of gravity of the object based upon said accelerated and non-accelerated load signals.

DETAILED DESCRIPTION OF THE INVENTION

Figure 1:
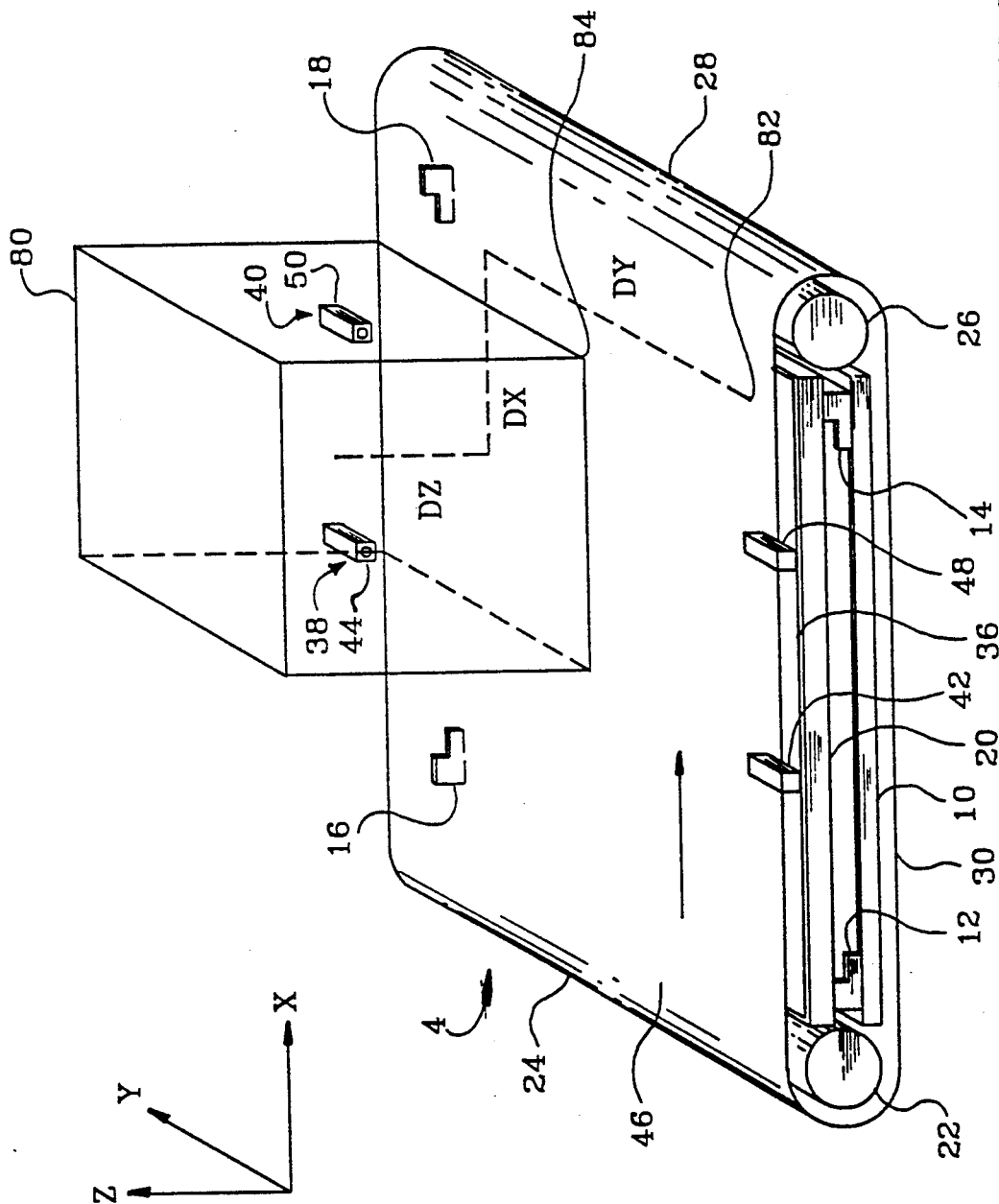
FIG. 1 is a schematic perspective view with partial cutaway, of one embodiment of the measuring station of the present invention.
Figure 2:
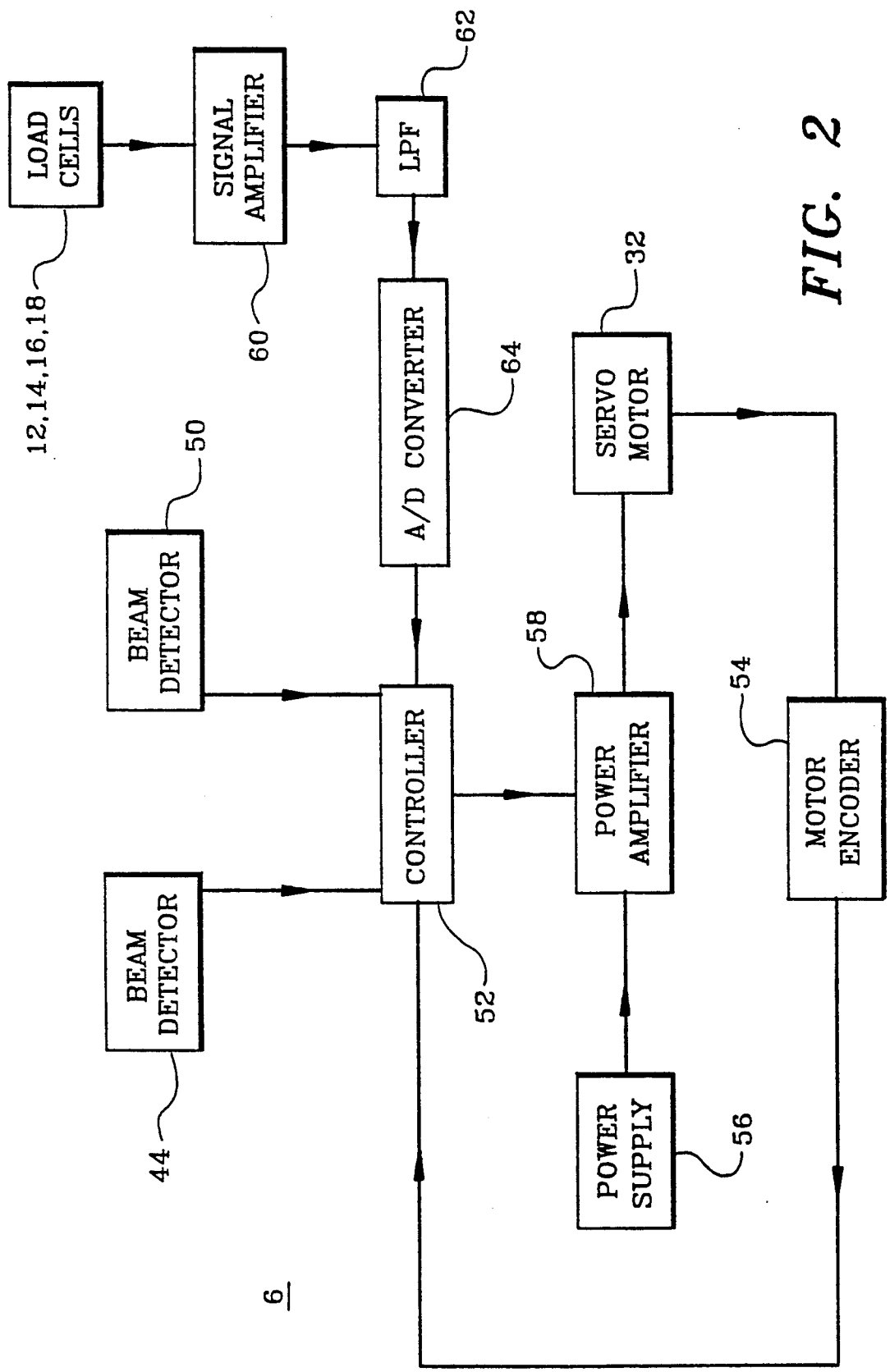
FIG. 2 is a block diagram representative of the control system used to control the conveyor assembly of the measuring station in FIG. 1.
Figure 3:
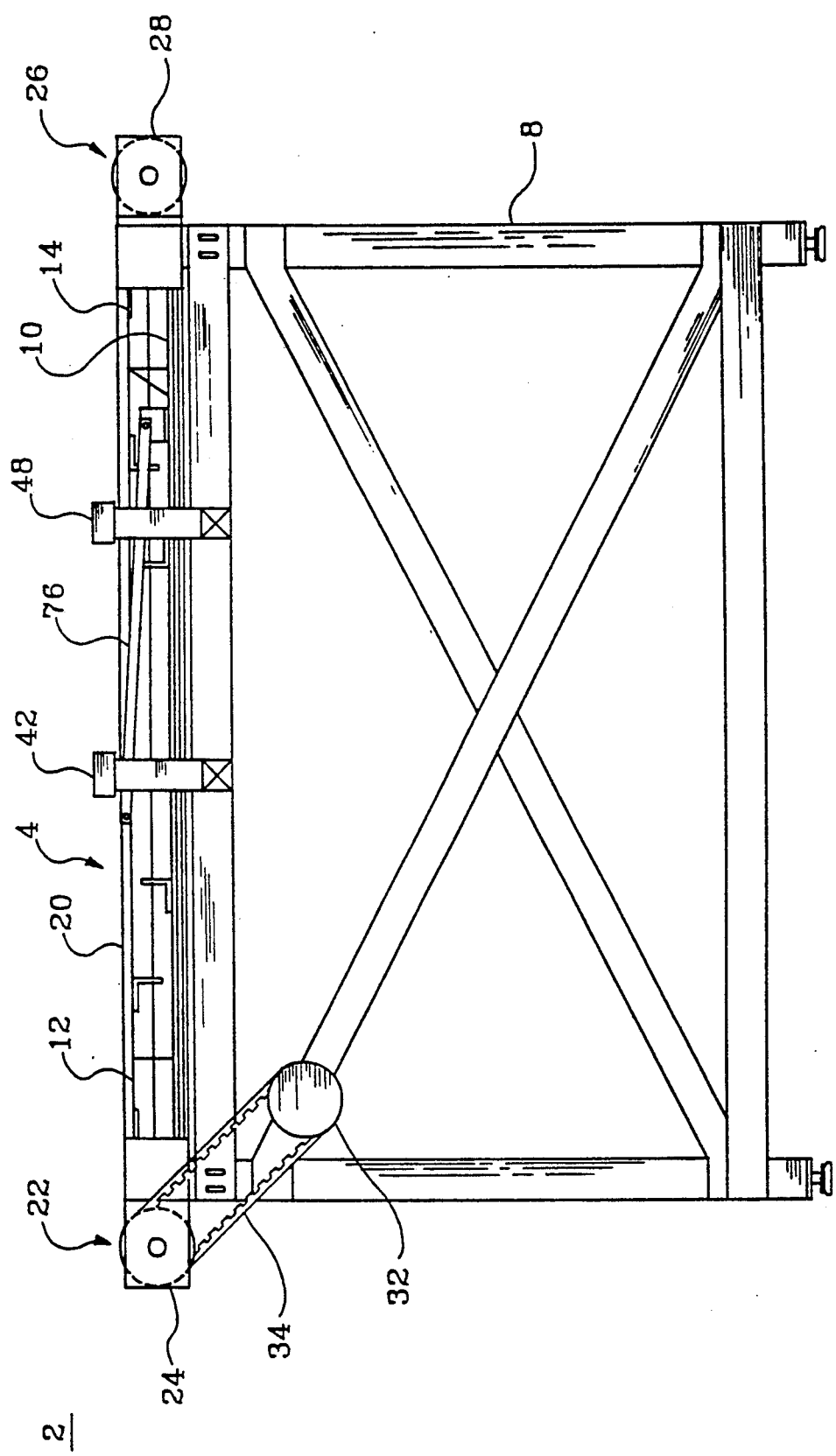
FIG. 3 is a side view of the measuring station in FIG. 1 with the tracking belt removed.

Referring now to FIGS. 1, 2, 3, there are shown a schematic perspective view with partial cutaway, a block diagram representative of the control system, and a side view with the tracking belt removed, respectively, of measuring station 2 of the present invention for determining the three-axis center of gravity of an object. Measuring station 2 includes conveyor assembly 4, control system 6, and support frame 8. Control system 6 controls the operations of conveyor assembly 4, which is supported by support frame 8.

Sub plate 10, which is part of support frame 8, supports four load cells 12, 14, 16, 18. Load cells 12, 14, 16, 18 are force measuring devices that generate load signals representative of the load forces exerted by an object disposed upon conveyor assembly 4. Load cells 12, 14, 16, 18 are disposed upon sub plate 10 in a rectangular arrangement. Load cells 12, 14, 16, 18 in turn support super plate 20. Driver pulley 22 is rotatably connected to support frame 8 at upstream end 24, and idler pulley 26 is rotatably connected to support frame 8 at downstream end 28 of measuring station 2. Tracking belt 30, a flat continuous conveyor belt, loops around driver pulley 22, over super plate 20, around idler pulley 26, and under sub plate 10.

Servomotor 32 is attached to support frame 8 and drives driver pulley 22 through drive belt 34. Drive belt 34, which loops around both driver pulley 22 and the mechanical output of servomotor 32, may be toothed to reduce slipping. When servomotor 32 is driven, belt drive 34 rotates driver pulley 22, which in turn drives tracking belt 30 over super plate 20. Passive idler pulley 26 rotates to provide easy motion of tracking belt 30.

Super plate 20 may be comprised of a plastic honeycomb layer sandwiched between two aluminum face sheets. This honeycomb sandwich structure reduces the weight of super plate 20 and thereby minimizes forces exerted on load cells 12, 14, 16, 18 that are not exerted by an object supported by measuring station 2. Ultra high density molecular weight polyethylene sheet 36 is bonded to the top surface of the top aluminum face sheet of this honeycomb sandwich structure. Polyethylene sheet 36 reduces the friction between tracking belt 30 and super plate 20 and thereby reduces the wear of tracking belt 30.

Support frame 8 also supports photoswitches 38, 40, which signal the arrival and departure of objects at selected locations upon measuring station 2. Photoswitch 38 is comprised of beam emitter 42 and beam detector 44 which are located at opposite sides of conveyor assembly 4. Beam emitter 42 and beam detector 44 are positioned and aligned such that the beam emitted by beam emitter 42 travels above surface 46 of tracking belt 30 and is received and detected at beam detector 44. Similarly, photoswitch 40 is comprised of beam emitter 48 and beam detector 50 which are positioned and aligned on opposite sides of conveyor assembly 4, such that the beam emitted by beam emitter 48 travels above surface 46 of tracking belt 30 and is received and detected at beam detector 80. Photoswitch 38 is upstream of photoswitch 40.

The cartesian coordinate system for measuring station 2 may be defined such that the X axis is the flow direction of objects on tracking belt 30, the Y axis is perpendicular to the X axis and parallel to the plane defined by surface 46 of tracking belt 30, and the Z axis is normal to surface 46 of tracking belt 30. The locations of load cells 12, 14, 16, 18 define a rectangle that is aligned such that two sides of the rectangle are parallel to the X axis and the other two sides are parallel to the Y axis.

Referring now to FIG. 2, control system 6 controls conveyor assembly 4 of measuring station 2 of the present invention. Controller 52 of control system 6 receives signals generated by load cells 12, 14, 16, 18, motor encoder 54, and beam detectors 44, 50, and generates signals to drive servomotor 32. Power to servomotor 32 is supplied by power supply 56 and amplified by power amplifier 58 according to the signals from controller 52. The amount of power to servomotor 32 dictates the speed at which servomotor 32, a three-phase brushless motor, drives driver pulley 22, which in turn drives tracking belt 30.

Load cells 12, 14, 16, 18 generate analog signals representative of the force exerted by objects supported by conveyor assembly 4. These analog signals are amplified by signal amplifier 60. The amplified signals from signal amplifier 60 are then filtered by low-pass filter 62 and subsequently digitized by analog-to-digital converter 64. The resulting digitized signals are received by controller 52 and used to determine the three-axis center of gravity of objects supported upon measuring station 2.

The signals sent to controller 52 from motor encoder 54 and beam detectors 44, 50 are used by controller 52 to determine the signals sent to power amplifier 58 to drive servomotor 32. Signals from motor encoder 54 and beam detectors 44, 50 may also be used to keep track of the X-axis position of an object upon tracking belt 30. Motor encoder 54 generates signals representative of the angular position of the mechanical output of servomotor 32. Changes in the angular position of the mechanical output of servomotor 32 may be directly related to changes in the X-axis position of objects on tracking belt 30, if no slippage exists in the links between the mechanical output of servomotor 32 and the object. The signals received by controller 52 from beam detectors 44, 50 signify when an object upon measuring station 2 trips photoswitches 38, 40, respectively. Using these signals from motor encoder 54 and beam detectors 44, 50, controller 52 may track the motion of objects upon measuring station 2. Controller 52 also uses the signals from beam detectors 44, 50 to control operations of conveyor assembly 4.

Control system 6 with controller 52 and conveyor assembly 4 with servomotor 32 serve to propagate, or selectively accelerate and non-accelerate, a supported object in the X-axis direction. Those skilled in the art will understand that, in alternative embodiments of the present invention, the supported object may be propagated in any direction not parallel to the direction of gravity.

Figure 4:
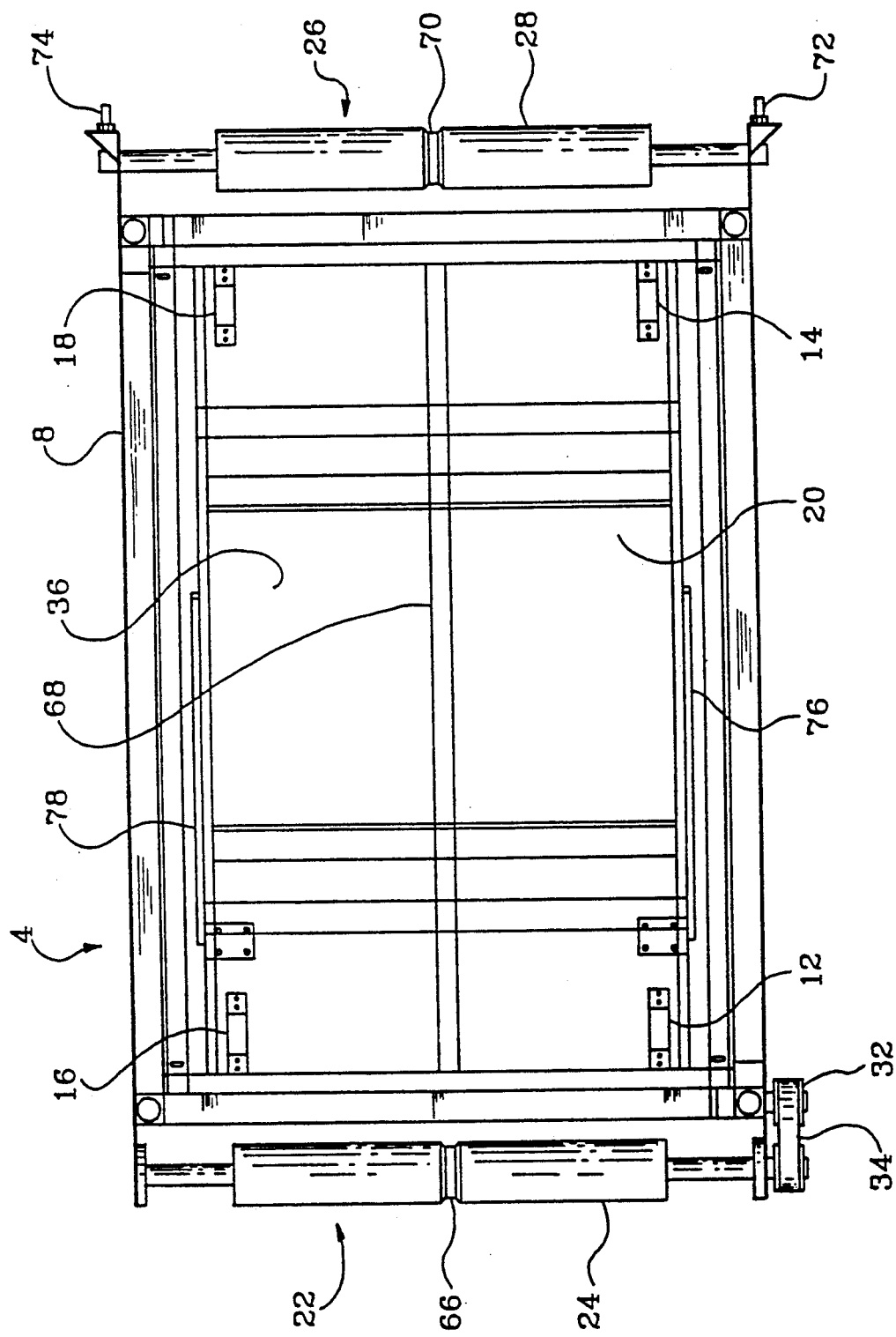
FIG. 4 is a top plan view of the measuring station of FIG. 1 with the tracking belt removed.

Further details of a preferred embodiment of measuring station 2 of the present invention will now be described. Referring now to FIG. 4, there is shown a top plan view of measuring station 2 of the present invention with tracking belt 30 removed. Driver pulley 22, super plate 20, and idler pulley 26 have belt tracking grooves 66, 68, 70, respectively. Tracking belt 30 has a V-shaped tracking rib (not shown) bonded near the center of its inner surface. The tracking rib of tracking belt 30 fits into belt tracking grooves 66, 68, 70 to keep tracking belt 30 from "wandering" in the Y-axis direction during operation of conveyor assembly 4. Pulley adjustment screws 72, 74 hold idler pulley 26 onto support frame 8, and allow adjustment of the alignment of idler pulley 26 with respect to driver pulley 22 and adjustment of the tension in tracking belt 30.

Super plate 20 is attached to sub plate 10 by two drag links 76, 78. Drag links 76, 78 prevent super plate 20 from sliding in the X-axis direction during operation of conveyor assembly 4. Drag links 76, 78 also minimize the application of horizontal forces on load cells 12, 14, 16, 18.

Figure 5:
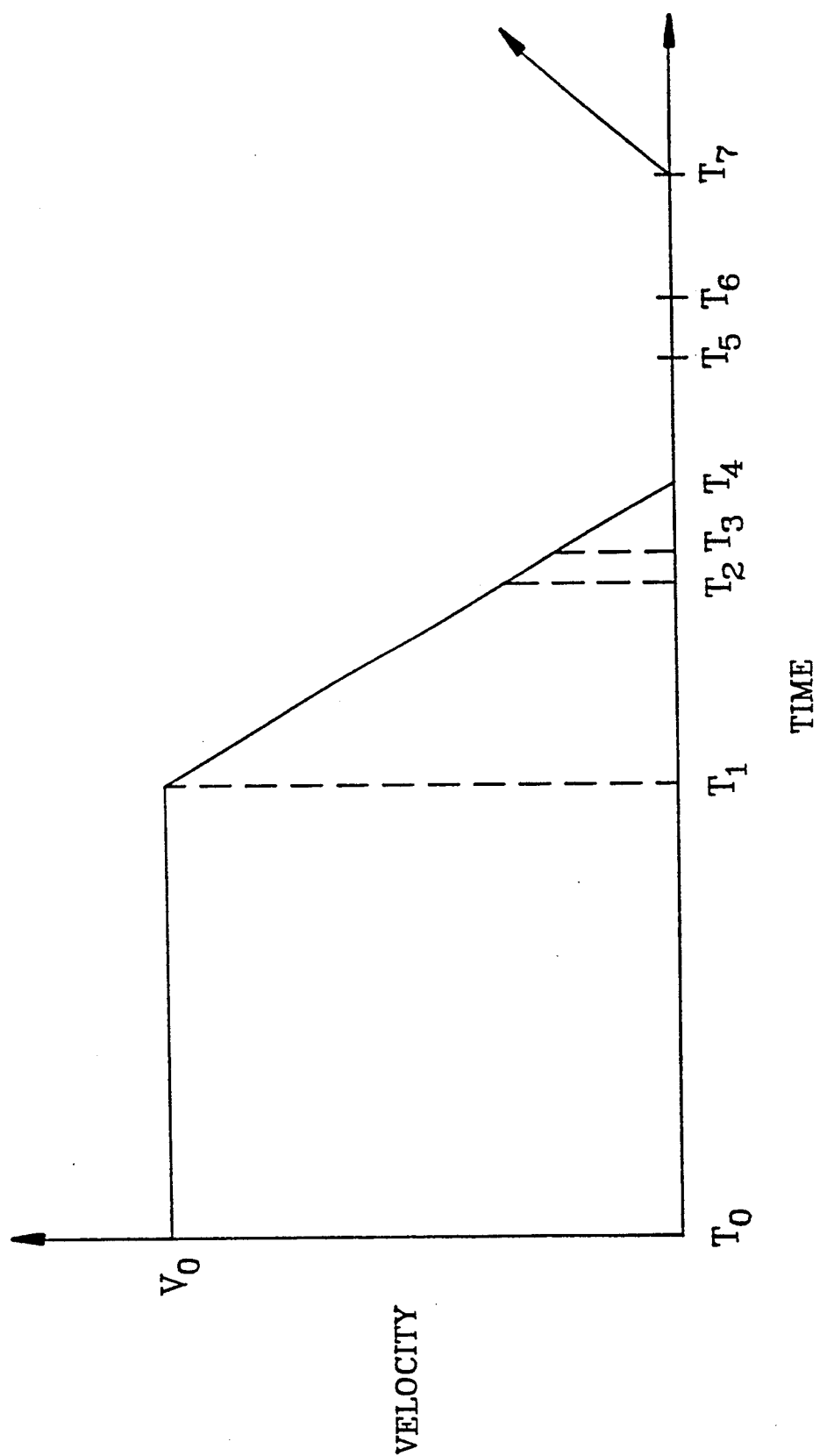
FIG. 5 is a graphical representation of the sequence of events of the method of the present invention for using the measuring station in FIG. 1.

Referring now to FIG. 5, there is shown a graphical representation of the sequence of events for determining the three-axis center of gravity of an object using measuring station 2 of the present invention. FIG. 5 depicts the velocity of tracking belt 30 as a function of time. Prior to time $T_0$, package 80, the workpiece, proceeds along an upstream conveyor path (not shown) toward measuring station 2. The upstream conveyor path abuts measuring station 2 at upstream end 24.

The upstream conveyor path has means for controlling the position of package 80 in the Y-axis direction. This may be accomplished using a diagonal roller/guide rail assembly (not shown) to left or right justify package 80. In a preferred embodiment, this justification aligns one edge of package 80 with the line defined by load cells 16, 18. It will be understood by those skilled in the art that, in alternative embodiments of the present invention, information regarding the Y-axis position of package 80 may be detected upstream of measuring station 2 and provided to controller 52 for use in computing the Y-axis offset.

At time $T_0$, package 80 begins to transfer from the upstream conveyor path to measuring station 2. From time $T_0$ to time $T_1$, controller 52 controls servomotor 32 to drive tracking belt 30 at a preselected constant velocity $V_0$ that is selected to match the velocity of the upstream conveyor path, thereby ensuring smooth transfer of package 80 from the upstream conveyor path to measuring station 2. Time $T_1$ is the time when package 80 trips photoswitch 38 and beam detector 44 sends a trip signal to controller 52. When controller 52 receives the trip signal from beam detector 44, controller 52 begins to send signals to cause servomotor 32 to reduce the velocity of package 80 at a constant rate of deceleration. Controller 52 may use the signals from motor encoder 54 as feedback to maintain a constant deceleration rate. Deceleration at the same constant rate continues from time $T_1$ until time $T_4$, the time at which tracking belt 30 stops moving.

Time $T_2$ is the time when package 80 trips photoswitch 40 and beam detector 50 sends a trip signal to controller 52. When controller 52 receives the trip signal from beam detector 50, controller 52 begins to measure and record load signals $F_2''$, $F_4''$ generated by load cells 14, 18, respectively. Controller 52 continues to measure and record load signals $F_2''$, $F_4''$ from time $T_2$ through time $T_3$. Times $T_2$, $T_3$ follow time $T_1$ and precede time $T_4$. Thus, load signals $F_2''$, $F_4''$ correspond to the loads applied to load cells 14, 18 while package 80 is still moving at a constant rate of deceleration.

The positions of photoswitch 38 and photoswitch 40 along the sides of measuring station 2 are selected to insure proper operation of measuring station 2. First of all, the position of photoswitch 40 is selected to insure that, by time $T_2$, all of the weight of package 80 is supported by measuring station 2. Secondly, the distance between them is selected to insure that, from time $T_2$ to time $T_3$, package 80 is moving at a well-controlled rate of deceleration not far from the stopping point of package 80 at time $T_4$.

From time $T_5$ to time $T_6$, both of which follow time $T_4$, load signals $F_1$, $F_2$, $F_3$, $F_4$ are generated by load cells 12, 14, 16, 18, respectively, and recorded by controller 52, while package 80 is at rest upon conveyor assembly 4. It will be noted that an interval is preferably provided between time $T_4$ and time $T_5$. This interval is desirably sufficiently long that any vibrations in measuring station 2 as a result of the deceleration process will be substantially dampened. At time $T_7$, following time $T_6$, servomotor 32 again begins to drive conveyor assembly 4 to move package 80 off measuring station 2 and onto the downstream conveyor path (not shown), which abuts measuring station 2 at downstream end 28. It will be understood that measuring station 2 may be used in conjunction with abutting upstream and downstream conveyor paths to determine the center of gravity of packages in a stream.

The three-axis center of gravity of package 80 is then calculated by controller 52 using load signals F1, F2, F3, F4, F2″, F4″. The total weight W of package 80 is calculated from load signals F1, F2, F3, F4, such that:

$$W = F1 + F2 + F3 + F4. \quad (1)$$

The X-axis offset DX is calculated, such that:

$$DX = \frac{X(F1 + F3)}{W}, \quad (2)$$

where X is the distance between load cell 12 and load cell 14, and DX is the distance along the X axis from the center of gravity of package 80 to the line between load cells 14, is, as shown in FIG. 1.

Similarly, the Y-axis offset DY is calculated, such that:

$$DY = \frac{Y(F3 + F4)}{W}, \quad (3)$$

where Y is the distance between load cell 14 and load cell 18, and DY is the distance along the Y axis from the center of gravity of package 80 to the line between load cells 12, 14, as shown in FIG. 1.

The Z-axis offset DZ is calculated, such that:

$$DZ = \frac{X((F2'' + F4'') - (F2 + F4))}{F5}, \quad (4)$$

where X is as before, F5 is a function of the deceleration rate of package 80 from time $T_2$ to time $T_3$, and DZ is the distance along the Z-axis from the center of gravity of package 80 to surface 46 of tracking belt 30, as shown in FIG. 1. The deceleration force function F5 is the product of the total weight W of package 80 times a factor equal to the deceleration rate of package 80 in gravity force units. For example, when package 80 is decelerated at 0.3 times the acceleration of gravity (approximately 9.8 meters per second per second), the deceleration force function F5 is 0.3 W.

The larger the deceleration rate of package 80, the larger the difference between (F2″+F4″) and (F2+F4) in Equation (4). Since load signals F2″, F4″, F2, F4 will have some inherent noise, the larger the difference between (F2″+F4″) and (F2+F4), the larger the signal-to-noise ratio in their difference and the more accurate the measure of Z-axis offset DZ. Thus, large deceleration rates lead to more accurate results. However, if the deceleration rate is too large, package 80 may slip or roll upon tracking belt 30. Therefore, the deceleration rate should be large enough to provide accurate results, yet small enough to prevent slipping or rolling of package 80 upon tracking belt 30. In other words, the coefficient of friction must be greater than the rate of deceleration. Measuring station 2 of the present invention may be typically operated with a deceleration rate of 0.3 G or approximately 2.9 meters per second per second, where the acceleration of gravity G is approximately 9.8 meters per second per second.

The offsets DX, DY, DZ establish the coordinates of the center of gravity of package 80 relative to point 82 on surface 46 of tracking belt 30 directly above load cell 14. Of course, it will be desired to determine the center of gravity of the package relative to a point on, or edge of, the package. In order to determine the three-axis center of gravity of package 80 relative to a corner of package 80, such as corner 84, the relative location of corner 84 with respect to point 82 may be determined.

The Y-axis coordinate of corner 84 relative to point 82 may be determined from knowledge of the upstream Y-axis justification of package 80. As noted above, this information may be detected upstream of measuring station 2 and provided to controller 52. Such justification would control the Y-axis position of package 80 during the periods from time $T_2$ to time $T_3$ and from time $T_5$ to time $T_6$ during which signals from load cells 12, 14, 16, 18 are generated. The Y-axis coordinate of corner 84 relative to point 82 may then be determined, knowing the Y-axis dimension of package 80 and the distance Y between load cell 14 and load cell 18.

The X-axis coordinate of corner 84 relative to point 82 may be determined by keeping track of the X-direction travel of package 80 throughout the measuring procedure from time $T_2$ to time $T_6$. This may be accomplished using the trip signal from beam detector 50. In addition, the signals from motor encoder 54 may be used to determine the X-axis distance package 80 travels following time $T_2$. This information may then be used to determine the X-axis coordinate of corner 84 relative to point 82.

Since the Z-axis coordinate of corner 84 is the same as the Z-axis coordinate of point 82, the Z-axis offset DZ is the same as the Z-coordinate of the center of gravity of package 80 relative to corner 84.

In order to compensate for vibrations and other noise that can adversely affect the signals generated by load cells 12, 14, 16, 18, multiple signals from each load cell may be generated and averaged to yield the values used to calculate offsets DX, DY, DZ. For example, if measuring station 2 has a resonant frequency at 30 Hz, then the signals generated by load cells 12, 14, 16, 18 may be sampled at 300 Hz with 10 samples taken and averaged for each load cell. This sampling and averaging may occur between times $T_2$, $T_3$ and again between times $T_5$, $T_6$.

Package 80 is still moving between times $T_2$, $T_3$. Thus, when multiple load cell signals are generated and averaged during this period, each signal corresponds to a different X-axis position of package 80. To account for this X-axis motion, the average X-axis position of package 80 during time $T_2$ to time $T_3$ may be calculated and used to determine the three-axis center of gravity.

Furthermore, the average X-axis position of package 80 during the accelerated measurements between times $T_2$, $T_3$ will differ from the X-axis position of package 80 during the non-accelerated measurements between times $T_5$, $T_6$. To account for this difference, an X-axis offset may be used when calculating the three-axis center of gravity. Alternatively, tracking belt 30 may be reversed after time $T_3$ to drive package 80 back to the average X-axis position of the accelerated measurements of times $T_2$, $T_3$ in order to take the non-accelerated measurements at the same X-axis position.

Note that the term "accelerated measurements" refers to the load cell signals generated when the package is decelerated, and that "non-accelerated measurements" are made when the package is not moving. Deceleration is the same as negative acceleration, and non-acceleration refers either to any constant velocity, including zero velocity.

It will be understood by those skilled in the art that the procedure described above is only one way of using measuring station 2 to perform the method of the present invention. The accelerated measurements may be based on either acceleration (positive acceleration) or deceleration (negative acceleration) of package 80 upon tracking belt 30. Similarly, the non-accelerated measurements may be generated during any non-acceleration of package 80. That is, the non-accelerated measurements may occur while package 80 is driven at a constant non-zero rate or while package 80 is at rest upon conveyor assembly 4. In addition, the non-accelerated measurements may be generated either before or after the accelerated measurements.

It will also be understood by those skilled in the art that configurations of load cells and coordinate axes other than those of measuring station 2 are within the scope of the present invention. In theory, the objects to be characterized must be supported at at least three non-collinear points, that is, three points that do not lie in the same straight line. For example, in an alternative embodiment, three load cells may be used with two load cells positioned at either side of downstream end 28 and the third load cell at the center of upstream end 24 of conveyor assembly 4. In addition, in alternative embodiments, coordinate axes other than the X-, Y-, and Z-axes of FIG. 1 are within the scope of the present invention. Any three-dimensional coordinate system may be used with the present invention.

Those skilled in the art will also understand that photoswitches 38, 40 are just one type of limit switch that may be used in the present invention. Other types of limit switches may also be used to inform controller 52 of the arrival and departure of package 80 at different points upon measuring station 2.

It will be further understood that various changes in the details, materials, and arrangements of the parts which have been described and illustrated in order to explain the nature of this invention may be made by those skilled in the art without departing from the principle and scope of the invention as expressed in the following claims.

What is claimed is:

1. An apparatus for determining a first component of the center of gravity of an object along a first axis and a second component of the center of gravity of the object along a second axis, wherein the first and second axes are two axes of a three-dimensional coordinate system, comprising:
   (a) support means for supporting the load of the object at a plurality of known non-collinear locations;
   (b) load sensing means for generating a load signal representative of the load applied by the supported object at each of said non-collinear locations;
   (c) controller means for receiving said load signals and for calculating the first and second components of the center of gravity of the supported object based upon said load signals; and
   (d) first axis location means for generating and providing to said controller means a first axis location signal representative of the location of the supported object along the first axis, wherein said controller means calculates the first component of the center of gravity of the supported object based upon said first axis location signal.

2. The apparatus of claim 1, wherein said controller means receives second axis position information for the supported object and determines the relationship between the second component of the center of gravity of the supported object and said second axis position.

3. The apparatus of claim 1, wherein said load sensing means comprises four point-like load sensors.

4. A method for determining a first component of the center of gravity of an object along a first axis and a second component of the center of gravity of the object along a second axis, wherein the first and second axes are two axes of a three-dimensional coordinate system, comprising the steps of:
   (a) supporting the load of the object at a plurality of known non-collinear locations;
   (b) generating a load signal representative of the load applied by the supported object at each of said non-collinear locations;
   (c) calculating the first and second components of the center of gravity of the supported object based upon said load signals; and
   (d) generating a first axis location signal representative of the location of the supported object along the first axis, wherein step (c) comprises the step of calculating the first component of the center of gravity of the supported object based upon said first axis location signal.

5. The method of claim 4, further comprising the steps of receiving second axis position information for the supported object, and determining the relationship between the second component of the center of gravity of the supported object and said second axis position.

6. An apparatus for determining a component of the center of gravity of an object along a first direction not perpendicular to the direction of gravity, comprising:
   (a) support means for supporting the load of the object at a plurality of known non-collinear locations;
   (b) propagation means for selectively accelerating and non-accelerating the supported object in a second direction not parallel to the first direction and not parallel to the direction of gravity;
   (c) load sensing means for generating an accelerated load signal representative of the load applied at at least one of said non-collinear locations by the supported object during acceleration of the supported object and for generating a non-accelerated load signal representative of the load applied at at least one of said non-collinear locations by the supported object during non-acceleration of the supported object;
   (d) means for obtaining the rate of acceleration of the supported object; and
   (e) controller means for receiving said accelerated and non-accelerated load signals and the rate of acceleration, and for determining the component of the center of gravity of the supported object based upon said received signals and the rate of acceleration.

7. The apparatus of claim 6, further comprising locating means for generating and providing to said propagation means a second direction location signal representative of the location of the supported object along said second direction, wherein said propagation means initiates acceleration of the supported object in response to said second direction location signal.

8. The apparatus of claim 6, wherein said load sensing means comprises four point-like load sensors.

9. A method for determining a component of the center of gravity of an object along a first direction not perpendicular to the direction of gravity, comprising the steps of:
   (a) supporting the load of the object at a plurality of known non-collinear locations;
   (b) accelerating the supported object in a second direction not parallel to the first direction and not parallel to the direction of gravity;
   (c) generating an accelerated load signal representative of the load applied at at least one of said non-collinear locations by the supported object during acceleration of the supported object;
   (d) obtaining the rate of acceleration of the supported object;
   (e) moving the supported object at a constant non-accelerated rate in said second direction;
   (f) generating a non-accelerated load signal representative of the load applied at at least one of said non-collinear locations by the supported object during non-acceleration of the supported object; and
   (g) calculating the component of the center of gravity of the supported object based upon said accelerated and non-accelerated load signals and the rate of acceleration.

10. The method of claim 9, further comprising the steps of:
   (h) determining second direction location of the supported object along said second direction; and
   (i) initiating the accelerating of step (b) based upon said second direction location.

11. The method of claim 9, wherein steps (b) and (c) occur before steps (e) and (f).

12. The method of claim 9, wherein the accelerating of step (b) is negative acceleration.

13. The method of claim 9, wherein the moving of step (e) is at zero velocity.

14. An apparatus for determining first, second, and third components of the center of gravity of an object, wherein the first, second, and third components correspond to the components of the center of gravity along first, second, and third axes of a three-dimensional coordinate system, respectively, wherein the first and second axes are not parallel to the direction of gravity and the third axis is not perpendicular to the direction of gravity, comprising:
   (a) support means for supporting the load of the object at a plurality of known non-collinear locations;
   (b) propagation means for selectively accelerating and non-accelerating the supported object along said first axis;
   (c) load sensing means for generating an accelerated load signal representative of the load applied at at least one of said non-collinear locations by the supported object during acceleration of the supported object and for generating a non-accelerated load signal representative of the load applied at each of said non-collinear locations by the supported object during non-acceleration of the supported object;
   (d) means for obtaining the rate of acceleration of the supported object; and
   (e) controller means for calculating the first, second, and third components of the center of gravity of the supported object based upon said accelerated and non-accelerated load signals and the rate of acceleration.

15. The apparatus of claim 14, further comprising first axis location means for generating and providing to said controller means a first axis location signal representative of the location of the supported object along the first axis, wherein said controller means calculates the first component of the center of gravity of the supported object based upon said first axis location signal.

16. The apparatus of claim 14, wherein said controller means receives second axis position information for the supported object and determines the relationship between the second component of the center of gravity of the supported object and said second axis position.

17. The apparatus of claim 14, wherein said load sensing means comprises four point-like load sensors.

18. The apparatus of claim 14, further comprising locating means for generating and providing to said propagation means a first axis location signal representative of the location of the supported object along the first axis, wherein said propagation means initiates acceleration of the supported object in response to said first axis location signal.

19. A method for determining first, second, and third components of the center of gravity of an object, wherein the first, second, and third components correspond to the components of the center of gravity along first, second, and third axes of a three-dimensional coordinate system, respectively, wherein the first and second axes are not parallel to the direction of gravity and the third axis is not perpendicular to the direction of gravity, comprising the steps of:
   (a) supporting the load of the object at a plurality of known non-collinear locations;
   (b) selectively accelerating and non-accelerating the supported object along said first axis;
   (c) generating an accelerated load signal representative of the load applied at at least one of said non-collinear locations by the supported object during acceleration of the supported object;
   (d) generating a non-accelerated load signal representative of the load applied at each of said non-collinear locations by the supported object during non-acceleration of the supported object;
   (e) obtaining the rate of acceleration of the supported object; and
   (f) calculating the first, second, and third components of the center of gravity of the supported object based upon said accelerated and non-accelerated load signals and the rate of acceleration.

20. The method of claim 19, further comprising the step of generating a first axis location signal representative of the location of the supported object along the first axis, wherein step (f) comprises the step of calculating the first component of the center of gravity of the supported object based upon said first axis location signal.

21. The method of claim 19, wherein step (f) comprises the steps of:
   (1) receiving second axis position information for the supported object; and
   (2) determining the relationship between the second component of the center of gravity of the supported object and said second axis position.

22. The method of claim 19, wherein step (c) comprises the step of generating four accelerated load signals with four point-like load sensors.

23. The method of claim 19, further comprising the step of generating a first axis location signal representative of the location of the supported object along the first axis, wherein step (b) further comprises the step of initiating acceleration of the supported object in response to said first axis location signal.

* * * * *

UNITED STATES PATENT AND TRADEMARK OFFICE
CERTIFICATE OF CORRECTION

PATENT NO. : 5,301,544
DATED : April 12, 1994
INVENTOR(S) : Steven L. Smith

It is certified that error appears in the above-indentified patent and that said Letters Patent is hereby corrected as shown below:

col. 4, line 51, "80" should read --50--; and col. 7, line 25, "is," should read --18,--.

Signed and Sealed this

Ninth Day of August, 1994

Attest:

BRUCE LEHMAN

Attesting Officer     Commissioner of Patents and Trademarks